(12) United States Patent
Zhang et al.

(10) Patent No.: US 9,716,999 B2
(45) Date of Patent: Jul. 25, 2017

(54) METHOD OF AND SYSTEM FOR UTILIZING A FIRST NETWORK AUTHENTICATION RESULT FOR A SECOND NETWORK

(75) Inventors: David Xining Zhang, San Jose, CA (US); Huiyue Xu, Beijing (CN); Bing Li, Beijing (CN)

(73) Assignee: Syniverse Communicationsm, Inc., Tampa, FL (US)

( * ) Notice: Subject to any disclaimer, the term of this patent is extended or adjusted under 35 U.S.C. 154(b) by 446 days.

(21) Appl. No.: 13/431,822

(22) Filed: Mar. 27, 2012

(65) Prior Publication Data

US 2012/0264402 A1 Oct. 18, 2012

Related U.S. Application Data

(60) Provisional application No. 61/476,642, filed on Apr. 18, 2011.

(51) Int. Cl.
| | |
|---|---|
| *H04W 36/00* | (2009.01) |
| *H04W 12/06* | (2009.01) |
| *H04L 29/06* | (2006.01) |
| *H04M 1/66* | (2006.01) |
| *H04W 88/06* | (2009.01) |

(52) U.S. Cl.
CPC ......... *H04W 12/06* (2013.01); *H04L 63/0815* (2013.01); *H04W 88/06* (2013.01)

(58) Field of Classification Search
CPC ....... H04W 4/00; H04W 12/06; H04W 88/06; H04W 36/14; H04W 36/18; H04W 36/30; H04W 52/40; H04W 84/045; H04W 92/02; H04L 63/081

USPC ...................................................... 455/435.1
See application file for complete search history.

(56) References Cited

U.S. PATENT DOCUMENTS

| | | |
|---|---|---|
| 6,308,267 B1 | 10/2001 | Gremmelmaier |
| 6,466,804 B1 | 10/2002 | Pecen et al. |
| 6,978,157 B1 | 12/2005 | Amiens |
| 7,065,340 B1 | 6/2006 | Einola |
| 7,171,460 B2 * | 1/2007 | Kalavade et al. ............ 709/223 |

(Continued)

OTHER PUBLICATIONS

D. Bendor, OutSmart, North America, "FMC: A Driving Trend," Pipeline, vol. 2, Issue 1, Jun. 2005, Pipeline Publishing LLC, pp. 1-2.

(Continued)

*Primary Examiner* — Huy C Ho
(74) *Attorney, Agent, or Firm* — Andriy Lytvyn; Smith & Hopen, P.A.

(57) ABSTRACT

A method and system for completing the authentication process in a second communication network (such as Wi-Fi or WiMAX) utilizes a user credential of a first communication network, such as GSM, UMTS, CDMA, or LTE. Preferably, the user credential is a SIM card, a USIM card, a R-UIM card, or a functionally similar component. The system includes a client and an authentication platform that retrieves Service State information of the user credential in the first communication network and passes the information to the authentication platform of the second communication network. The client is granted access to the second communication network after the authentication platform validates the client's service and subscription status with the first communication network.

60 Claims, 5 Drawing Sheets

(56) References Cited

U.S. PATENT DOCUMENTS

| | | | |
|---|---|---|---|
| 7,359,704 B1 | 4/2008 | Dizdarevic et al. | |
| 7,787,600 B1 | 8/2010 | Bari | |
| 8,929,329 B2* | 1/2015 | Crawford | H04W 36/14 370/331 |
| 2002/0187777 A1 | 12/2002 | Osterhout et al. | |
| 2002/0191575 A1 | 12/2002 | Kalavade et al. | |
| 2003/0214958 A1 | 11/2003 | Madour et al. | |
| 2004/0005886 A1 | 1/2004 | Oda et al. | |
| 2004/0248547 A1 | 12/2004 | Philsgard et al. | |
| 2005/0177733 A1 | 8/2005 | Stadelmann et al. | |
| 2005/0220139 A1 | 10/2005 | Aholainen | |
| 2006/0251008 A1 | 11/2006 | Wu et al. | |
| 2007/0019580 A1 | 1/2007 | Zhang et al. | |
| 2007/0019623 A1 | 1/2007 | Alt et al. | |
| 2007/0112446 A1* | 5/2007 | Deveaux | G06F 8/60 700/83 |
| 2007/0117577 A1 | 5/2007 | Harris | |
| 2007/0178885 A1 | 8/2007 | Lev | |
| 2007/0183363 A1 | 8/2007 | Liden | |
| 2007/0186106 A1 | 8/2007 | Ting et al. | |
| 2007/0208936 A1 | 9/2007 | Ramos Robles | |
| 2007/0254648 A1 | 11/2007 | Zhang et al. | |
| 2008/0077789 A1 | 3/2008 | Gondo | |
| 2008/0085707 A1 | 4/2008 | Fadell | |
| 2008/0260149 A1 | 10/2008 | Gehrmann | |
| 2009/0059874 A1 | 3/2009 | Carter | |
| 2009/0094680 A1 | 4/2009 | Gupta et al. | |
| 2009/0205028 A1 | 8/2009 | Smeets et al. | |
| 2009/0219902 A1* | 9/2009 | Aoyama | H04W 60/00 370/338 |
| 2009/0221265 A1 | 9/2009 | Liu et al. | |
| 2009/0271852 A1 | 10/2009 | Torres et al. | |
| 2010/0146262 A1 | 6/2010 | Zhang | |
| 2010/0232407 A1 | 9/2010 | Navali et al. | |
| 2010/0263022 A1 | 10/2010 | Wynn et al. | |
| 2010/0279698 A1 | 11/2010 | Wong | |
| 2010/0311404 A1 | 12/2010 | Shi et al. | |
| 2011/0007705 A1 | 1/2011 | Buddhikot et al. | |
| 2011/0041167 A1 | 2/2011 | Nguyen | |
| 2011/0047603 A1 | 2/2011 | Gordon et al. | |
| 2011/0154454 A1 | 6/2011 | Frelechoux | |
| 2011/0165896 A1 | 7/2011 | Stromberg et al. | |
| 2011/0269456 A1 | 11/2011 | Krishnaswamy et al. | |
| 2011/0271331 A1 | 11/2011 | Adams | |
| 2011/0277019 A1 | 11/2011 | Pritchard, Jr. | |
| 2011/0294472 A1 | 12/2011 | Bramwell et al. | |
| 2012/0149334 A1 | 6/2012 | Zhang | |

OTHER PUBLICATIONS

MobileIgnite, "Voice Call Handover Service: Functional Specification," Version 1.0, Sep. 21, 2006, Interoperability Group "Best Practices," pp. 1-52.

MobileIgnite Program—FAQ, "MobileIgnite Adds Eight New Members," www.mobileignite.org/news/pr_012506.html, pp. 1-2.

P. Congdon et al., "IEEE 802.1X Remote Authentication Dial in User Service (RADIUS) Usage Guidelines," Network Working Group, Request for Comments: 3580, Sep. 2003, http://www.ietf.org/rfc/rfc3580.txt, pp. 1-30.

H. Haverinen (ed.) et al., "Extensible Authentication Protocol Method for Global System for Mobile Communications (GSM) Subscriber Identity Modules (EAP-SIM)," Network Working Group, Request for Comments: 4186, Jan. 2006, http://www.ietf.org/rfc/rfc4186.txt, pp. 1-92.

J. Arkko et al., "Extensible Authentication Protocol Method for 3rd Generation Authentication and Key Agreement (EAP-AKA)," Network Working Group, Request for Comments: 4187, Jan. 2006, http://www.ietf.org/rfc/rfc4187.txt, pp. 1-79.

B. Anton et al., "Best Current Practices for Wireless Internet Serivice Provider (WISP) Roaming," Wi-Fi Alliance—Wireless ISP Roaming (WISPr) Version: 1.0, Feb. 2003, pp. 1-37.

Wireless Broadband Alliance, "WISPr 2.0," Doc Ref. No. WBA/RM/WISPr Version 01.00, Apr. 8, 2010, pp. 1-58.

Wireless Broadband Alliance, "EAP over WISPr 2.0 Trial," Jun. 9, 2010, pp. 1-22.

3GPP Organizational Partners (ARIB, ATIS, CCSA, ETSI, TTA, TTC), "3rd Generation Partnership Project; Technical Specification Group Core Network and Terminals; Mobile Application Part (MAP) specification (Release 9)," 3GPP TS 29.002, V9.1.0, Mar. 2010, pp. 1-923.

European Telecommunications Standards Institute, "Digital cellular telecommunications system (Phase 2+); Specification of the Subscriber Identity Module—Mobile Equipment (SIM-ME) interface; (GSM 11.11)," GSM Technical Specification, Jul. 1996, Version 5.3.0, pp. 1-113.

"The implementa® Virtual SIM System for Carrier Class GSM Gateways," http://www.implementa.com, unnumbered pp. 1-30.

M. Kasper et al., "Subscriber Authentication in Cellular Networks with Trusted Virtual SIMS," 10th International Conference on Advanced Communication Technology, ICACT 2008, vol. 2, Gangwon-Do, Feb. 17-20, 2008, pp. 903-908.

European Telecommunications Standards Institute, "Digital cellular telecommunications system (Phase 2); Mobile Application Part (MAP) specification (GSM 09.02)," European Telecommunication Standard, ETS 300 599, Jan. 1997, 4th ed., pp. 1-400.

European Telecommunications Standards Institute, "Digital cellular telecommunications system (Phase 2); Mobile Application Part (MAP) specification (GSM 09.02)," European Telecommunication Standard, ETS 300 599, Jan. 1997, 4th ed., pp. 401-781.

International Search report dated Jul. 10, 2012, International Application No. PCT/US2011/61395, Intl. Filing Date: Nov. 18, 2011, 14 pages.

International Search Report dated Jul. 10, 2012, International Application No. PCT/US2012/30986, Intl. Filing Date: Mar. 28, 2012, 12 pages.

* cited by examiner

Public class      Summary Constants | Inherited Constants | Fields | Class | Methods | Protected Methods | Inherited Methods |
[Expand All]

ServiceState      Since: API Level 1 extends Object
implements Parcelable java.lang.Object
- android.telephony.ServiceState Class Overview Contains phone state and service related information. The following phone information is included in returned ServiceState

- Service state: IN_SERVICE, OUT_OF_SERVICE, EMERGENCY_ONLY, POWER_OFF
- Roaming indicator
- Operator name, short name and numeric id
- Network selection mode public String getOperatorNumeric ()

Get current registered operator numeric id. In GSM/UMTS, numeric format is 3 digit country code plus 2 or 3 digit network code.

> Returns
>
> > Numeric format of operator, null if unregistered or unknown

Public int getState ()

Get current service state of phone

Fig. 5

METHOD OF AND SYSTEM FOR UTILIZING A FIRST NETWORK AUTHENTICATION RESULT FOR A SECOND NETWORK

RELATED APPLICATION

This patent application claims priority under 35 U.S.C. §119(e) of the U.S. provisional patent application Ser. No. 61/476,642, filed Apr. 18, 2011, and titled "Method and System for Utilizing First Network Authentication Result for Second Network," which is hereby incorporated by reference.

FIELD OF THE INVENTION

This invention relates to authentication methods for accessing different wireless telecommunications networks. More specifically, this invention relates to authenticating users roaming between different networks using a single user credential.

BACKGROUND OF THE INVENTION

The demand for and corresponding rapid growth of 3G/Wi-Fi or 4G/Wi-Fi capable dual-mode smartphones and devices require broader bandwidth than ever before. Wi-Fi networks have been used as alternatives for offloading mobile data access from 3G or 4G networks for both domestic and roaming data usage.

For mobile networks, user credentials are issued as a Subscriber Identity Module (SIM) for Global System for Mobile Communications (GSM) networks. A SIM card securely stores a secret authentication key (Ki) identifying a mobile phone service subscriber, as well as subscription information, preferences, and other information. The SIM card also securely stores A3 and A8 programmable algorithms, the same logic as the A3/A8 algorithm stored in the mobile network's Home Location Register (HLR). The SIM card also stores the International Mobile Subscriber Identity (IMSI), which is used to uniquely identify the mobile phone service subscriber. When the SIM card is manufactured, the IMSI is paired with an authentication key Ki, a 128-bit number used for authentication and cipher key generation. The Ki is stored only on the SIM card and at the HLR and is never transmitted across the network, on any link.

The SIM card has corresponding components in different mobile networks. For example, the corresponding component in Universal Mobile Telecommunications System (UMTS) networks is the Universal SIM (USIM) card. The corresponding component in Code Division Multiple Access (CDMA) networks is the Removable User Identity Module (R-UIM) card.

The user credential, as a SIM card, is needed in the smartphone to complete the authentication and service registration procedure in mobile networks. Utilizing the existing user credential for the authentication, authorization, and accounting (AAA) in Wi-Fi networks is a challenge for seamless roaming when offloading mobile data to Wi-Fi networks. Similar challenges will exist when roaming from 3G or 4G networks into WiMAX networks.

The standard formats and procedures to implement SIM-based authentication protocol (Extensible Authentication Protocol (EAP) Method for GSM Subscriber Identity Module, or EAP-SIM, for authentication and session key distribution using the SIM from the GSM) is defined in Internet Engineering Task Force (IETF) Request for Comments (RFC) 4186. IETF RFC 4187 defines the EAP method for UMTS Authentication and Key Agreement (EAP-AKA) authentication.

Implementing the SIM-based authentication procedure in Wi-Fi or WiMAX networks requires EAP-SIM/EAP-AKA client software on the mobile device. This authentication procedure includes the following steps:
1. The client on the mobile device retrieves the IMSI from the SIM card and sends it via the network components to the Authentication Server, which, for GSM networks, is the HLR.
2. The HLR, which has the SIM card's specific secret authentication key (Ki) as well as the A3 and A8 algorithms, generates a random number (RAND) as the challenge, derives the Signed Responses (SRESs) based on the A3 algorithm together with the Ki and RAND, and derives the encryption key (Kc) based on the A8 algorithm using Ki and RAND.
3. The client on the mobile device receives RAND from the network components as the challenge. The client calls the SIM card to calculate the SRESs using the A3 algorithm, the Ki, and the RAND value, given that the A3 algorithm and the Ki are securely stored in the SIM card.
4. The client sends back the SRES to the network components, which compare the SRES from the HLR against the SRES from the client. If the SRESs match, the mobile device passes the authentication procedure and the network allows the mobile device to access the network. Otherwise, the network denies service to the mobile device.

Generally, step 3 is important for the actual implementation of the client, as it needs to interface with the mobile device to call the SIM card algorithm. Due to sensitivity to subscriber data security concerns, it is difficult to implement the SIM-authentication procedure at the application layer because the operating system of the mobile device normally does not allow the application to directly interface with the SIM card. The operating system often encapsulates the interfaces in a core system driver layer and limits their access to a few applications that normally reside at the system core level.

Even if one operating system for a mobile device allows an application to directly interface to a SIM card, other operating systems may not make corresponding application programming interfaces (APIs) accessible. In these cases, the client is not generally available on the mobile devices. Thus, operating systems must be specifically modified for each mobile device before the mobile device can access, and thus roam between, different networks. This is an expensive, time consuming, and impractical procedure.

SUMMARY OF THE INVENTION

In accordance with embodiments of the present invention, a user credential authentication in a second communication network leverages the result of a user credential authentication from a first communication network. One embodiment of the invention bypasses the A3 algorithm in a SIM card and uses the authentication result of a mobile device in the first network using a public API to perform the authentication procedure in the second network. In one embodiment, the authentication result of the first network is transferred to the second network to pass the authentication requirements of the second network.

In one embodiment, the first network is a mobile network such as GSM, UMTS, CDMA, Long Term Evolution (LTE), Enhanced Data rates for GSM Evolution (EDGE), or another kind of 3G/4G mobile network, and the second communication network is Wi-Fi, World Interoperability for Microwave Access (WiMAX), or another kind of broadband Internet Protocol (IP) network. The user credential is issued by the first network's service provider as a means to uniquely and securely identify the subscriber, who uses and pays for the services offered by the first network's service provider. In different embodiments, the user credential is a SIM card in GSM networks, a USIM card in UMTS/LTE networks, a R-UIM card in CDMA/Evolution-Data (CDMA/EV-DO) networks, or any other functionally similar component. The functionally similar component is software, hardware, or any combination of both.

Preferably, the user credential is used by the second network as long as there is a business relationship between the two networks. Such a relationship enables the first network service operator's subscriber to access the second network operator's service using the credential in the user device.

In one embodiment, the user device is a dual-mode wireless device, such as a mobile phone, a mobile handset, or a USB dongle. "Dual-mode" means that the user device is able to register into two different networks simultaneously.

Systems implementing the principles of the invention include (a) a client (normally called a "Connection Manager") running on the mobile user device or the device's hosted operating system, or (b) gateway software running on an authentication gateway within the second network, or (c) both the client and the authentication gateway software. Those skilled in the art will recognize other components where the functionality of the client and gateway software can reside.

In one embodiment, the client uses an API of the user device's operating system to securely retrieve the user credential's (and thus the user device's) current service status on the first network. Examples of operating systems include, but are not limited to, Android™, Blackberry®, Windows Mobile, iOS™ (for iPhone, iPad, or other smartphones), Symbian®, Meego™, Mango, or other operating systems for wireless devices.

The client communicates the service status information package to a remote authentication server on the second network. This package includes, but is not limited to, the user device's unique identifier (such as the IMSI or the Mobile Station Integrated Services Digital Network (MSISDN)), an identifier of the first network (such as the Mobile Network Code (MNC) or the Mobile Country Code (MCC)), and the service status (including the Registration result). In one embodiment, once the remote authentication server receives this package, it generates a validation and authorization result.

The client further communicates with the remote authentication server to collect the validation and authorization result and triggers the login procedure in the second network. In one embodiment, the authorization result for accessing a Wi-Fi network is a one-time username and password combination granted by the remote authentication server. The client uses the one-time username and password combination to login to the Wi-Fi network using, for example, the Wireless Internet Service Provider Roaming version 1.0 (WISPr 1.0) login procedure.

An authentication module executing on the authentication server of the second network receives the user device's service status information package sent from the user device. The authentication module can further validate the user's service status with the first network's authentication system. The validation message is transmitted to the first network using a recognized protocol of the first network's authentication system, such as Mobile Application Part (MAP) protocol for GSM, UMTS networks, IS-41 for CDMA networks, or Diameter for LTE networks.

As a result of the validation, the authentication module grants or denies the user device access to services in the second network. As one example, the device is granted access by receiving a new identity (such as a one-time username and password combination) that can be used on the second network. The authentication module maintains the mapping of the user identity of the first network and the new identity recognized by the second network.

BRIEF DESCRIPTION OF THE DRAWINGS

FIG. 5 shows an API definition for the Android™ operating system, demonstrating the availability of the Service Status API available on Android model user devices, in accordance with one embodiment of the invention.

DETAILED DESCRIPTION OF THE INVENTION

Figure 1:
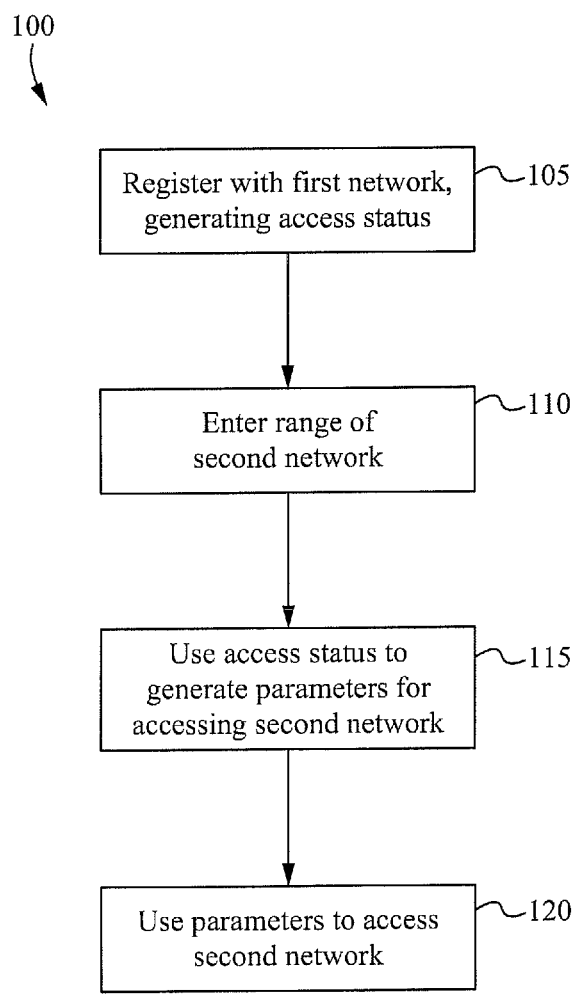
FIG. 1 is a flow chart of a method of accessing a second network, after being validated by a first network in accordance with one embodiment of the invention.

The teachings of the present invention are described with particular reference to numerous exemplary embodiments. However, it should be understood that these embodiments provide only a few examples of the many advantageous uses of the principles of the invention. None of the statements made herein are intended to limit the scope of the invention. In the drawings, like or similar elements are designated with identical reference numerals throughout the several views.

FIG. 1 is a high-level flow chart of a process 100 illustrating the principles of one embodiment of the invention. In the step 105, a mobile device is registered to access a first wireless network. A corresponding "access status" is generated, indicating that the mobile device is registered to use the first wireless network. In the step 110, the mobile device roams out of communication range of the first wireless network and into communication range of a second wireless network. In one embodiment, the access status is automatically transmitted to the second wireless network, for authenticating and validating the mobile device to use the second network. In the step 115, parameters for the mobile device to access the second wireless network are generated. The parameters are based on the access status and identification information of the mobile device generated for the first wireless network. In the step 120, the parameters are used to grant the mobile device access to the second wireless network, such as by registering the mobile device with the second wireless network.

Figure 2:
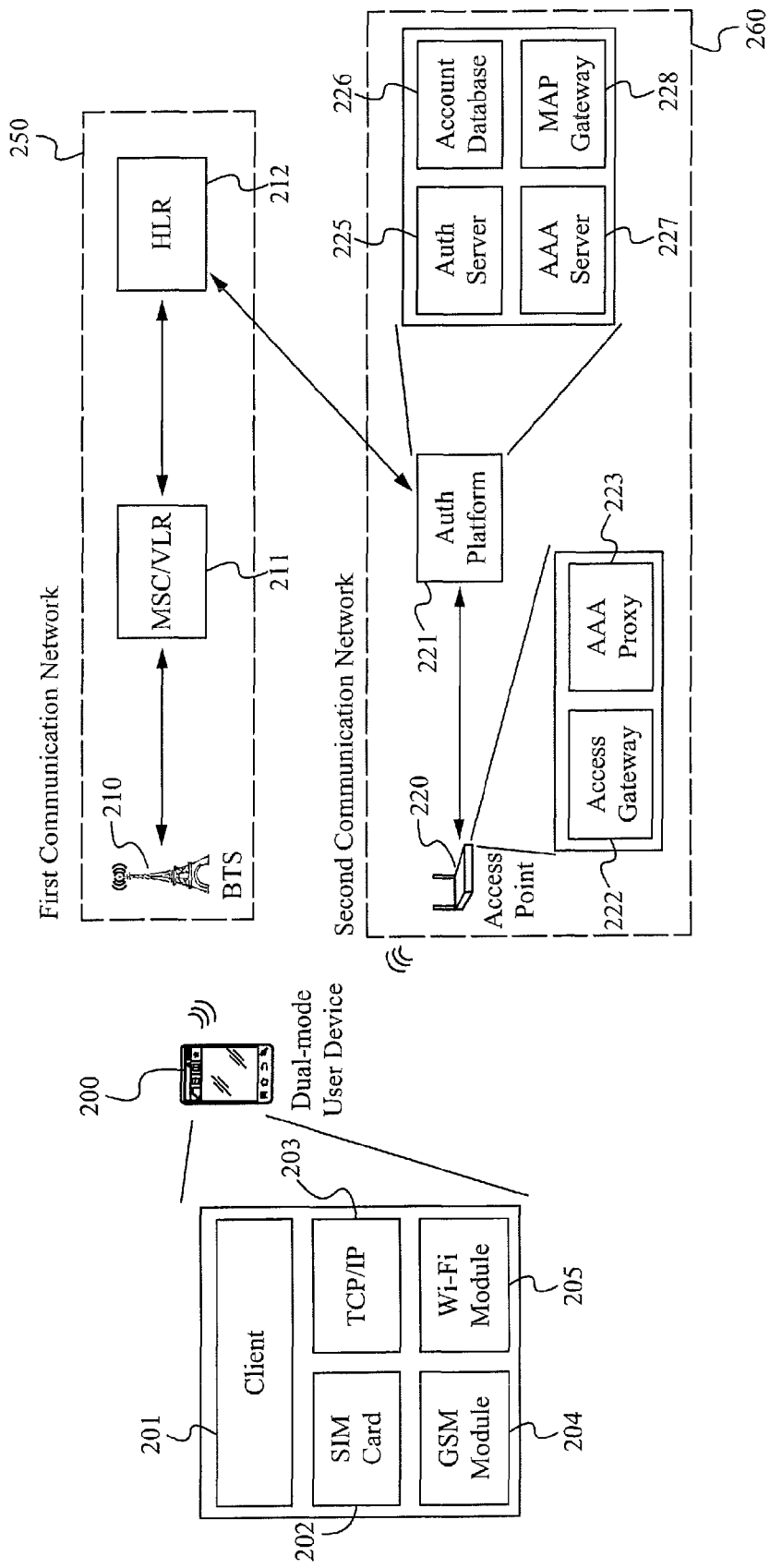
FIG. 2 shows a user mobile device roaming between and accessing two communication networks in accordance with one embodiment of the invention.

FIGS. 2-5 show more detailed embodiments of the invention. FIG. 2 shows a mobile device 200 accessing and roaming between first 250 and second 260 communication networks in accordance with one embodiment of the invention. Though FIG. 2 shows a single user device 200, it will be appreciated that the networks 250 and 260 are generally configured to allow multiple user devices to access them, concurrently or otherwise.

The mobile device 200 comprises client software 201, a SIM card 202, a TCP/IP protocol stack 203, a GSM module 204, and a Wi-Fi module 205. The GSM module 204 uses the SIM card 202 as the authentication credential to register into the first communication network 250. The first communication network 250 includes a Base Transceiver Station (BTS) 210, a Mobile Switching Center/Visiting Location Register (MSC/VLR) 211, and an HLR 212. The Wi-Fi module 205 provides the Wi-Fi signaling detection, registration, and connection with the second communication network 260, which includes an Access Point 220 and an Authentication (Auth) Platform 221.

The HLR 212 is the authentication center that stores all the data related to the SIM card 202, including the secret key Ki, the A3 and A8 algorithms, and other information as described above. The MSC/VLR 211 is the execution point that authenticates the SIM card 202 by collecting the challenge result SRES from the user device 200 and comparing the challenge result SRES with the SRES returned from the HLR 212. In one embodiment, the authentication is performed using an HLR, a Home Subscriber Server (HSS), an AuC, or an AAA server at the first network 250. Once the user device 200 is successfully authenticated, the MSC/VLR 211 allows the user device 200 to register into the first network 250. The Service State of the user device 200 will be changed to a state indicating that the first network 250 is now IN Service; that is, that the first network 250 is available to the user device 200.

In operation, the client 201 retrieves the identifier of the SIM card 202 in the form of an IMSI or MSISDN, retrieves the Service Status of the GSM module 204 via the system API of the user device 200, and passes through the TCP/IP protocol stack 203 to the Auth Platform 221 in the second communication network 260. The client 201 and the Auth Platform 221 communicate with each other using HTTP, HTTPS, Session Initiation Protocol (SIP), or any other proprietary protocol over TCP/IP.

The Access Point 220 in the second communication network 260 includes an Access Gateway 222 and an Authentication, Authorization, and Accounting (AAA) Proxy 223. The Access Gateway 222 is the system in the public WLAN network that implements the WISPr server side of the protocol and, in some embodiments, also implements the WRIX-I (as defined by the Wireless Broadband Alliance) or the AAA client side of the protocol. The AAA Proxy 223 is an optional component, depending on the network deployment, and implements the signaling proxy of Remote Authentication Dial In User Service (RADIUS), its successor, Diameter, or any other signaling proxy to a remote AAA server sitting either in the same operator's network or a roaming partner's network. As shown in FIG. 2, the AAA proxy 223 works as an intermediary, to proxy the AAA protocol between the Access Gateway 222 and the AAA Server 227 inside the Auth Platform 221.

The Auth Platform 221 comprises an Auth Server 225, an Account Database 226, an AAA Server 227, and a MAP Gateway 228. The Auth Server 225 is reachable by the client 201 through the Access Point 220 over TCP/IP networks, such as the Internet or a Local Area Network (LAN). The Auth Server 225 listens on a specific Ethernet Port of the Auth Platform 221 and waits for the client 201 to connect to the Auth Platform 221 and to exchange the service status information of user devices, such as the user device 200. In one embodiment, the Auth Server 225 includes a Web Server, which communicates with the client 201 using, for example, HTTP, HTTPS, or SIP. Once the Auth Server 225 successfully authenticates the client 201, it generates a one time authorization result and stores it in the Account Database 226, which can be further used by the AAA Server 227 to authorize the user when the Access Gateway 222 attempts to authenticate the credential of the user device 200. Meanwhile, the Auth Server 225 also relies on the MAP Gateway 228 to communicate with the HLR 212 of the first communication network 250. In a GSM/UMTS network, the protocol used between the MAP Gateway 228 and the HLR 212 is GSM MAP. In CDMA networks the corresponding protocol is IS-41 (also known as ANSI-41), and in LTE networks the corresponding protocol is Diameter or GSM MAP. Those skilled in the art will recognize other corresponding protocols for other networks accessed in accordance with the principles of the invention.

In one embodiment, some or all of the components, the client 200, the MSC/VLR 211, the HLR 212, the access point 220, and the Auth Platform 221, include memory containing computer-executable instructions for executing corresponding algorithms discussed herein (e.g., FIGS. 3 and 4) and at least one processor for executing those instructions. Alternatively, rather than memory containing instructions, each of the components contains application specific integrated circuits (ASICs) or functionally equivalent structures for executing the algorithms.

Figure 3:
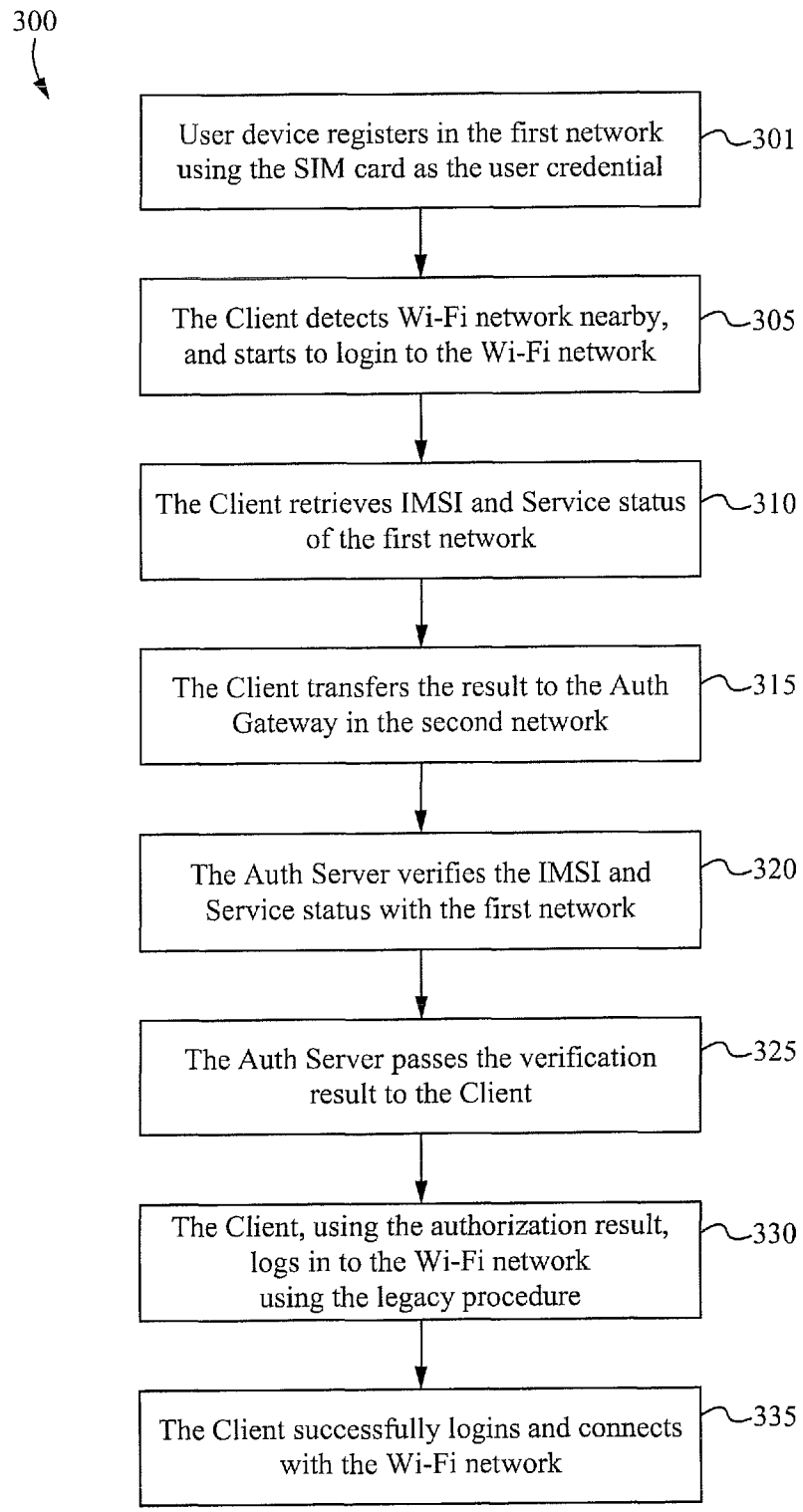
FIG. 3 is a flowchart for an authentication and registration procedure that uses a first network's service status to login to a second network in accordance with one embodiment of the invention.

The first communication network 250 generally has much wider coverage than the second communication network 260 has and is usually available to the user device 200. FIG. 3 shows the steps 300 of a SIM authentication process according to a preferred embodiment of the present invention. Referring to FIGS. 2 and 3, in the step 301, the user device 200 registers with the first communication network 250 using the SIM card 202 as the user credential. In the step 305, when the user device 200 enters into the coverage (e.g., communication range) of the second communication network 260, the client 201 detects the availability of the second communication network 260 and starts the procedure to login to the second communication network 260. In the step 310, the client 201 retrieves the IMSI from the SIM card 202 as the identifier of the SIM card 202 and also retrieves the device current Service Status with respect to the first network 250. In the step 315, the client 201 transfers the result (the device current Service Status) to the Auth Server 225 in the second network 260. In the step 320, the Auth Server 225 verifies the IMSI and the Service Status with the first network 250 via the MAP Gateway 228. The step 320 can include several message exchanges between the MAP Gateway 228 and the HLR 212. Here, for example, the Service Status for the user device 200 from two different resources (e.g., the HLR 212 and the client 201) are compared to determine whether the user device 200 is subscribed to the second communication network 260. After verification, in the step 325, the Auth Server 225 passes the "verification success" result as well as the authorization result to the client 201. In the step 330, the client 201 uses the authorization result to perform the login procedure to login to the second (e.g., Wi-Fi) network 260. In one embodiment, the authorization result includes a one-time username and password combination, which is widely implemented and supported in public Wi-Fi networks.

During the login procedure, the Access Gateway 222 validates the one-time username and password against the AAA Server 227 and Account Database 226, where the one-time username and password that the Auth Server 225 generated are stored. In one embodiment, the login protocol is WISPr 1.0, a protocol recommended by the Wi-Fi Alliance Committee as a best practice for supporting wireless roaming between providers of networks employing Wi-Fi technology. Those skilled in the art will recognize other protocols for logging into the second network 260, based on its network type or other factors.

Figure 4:
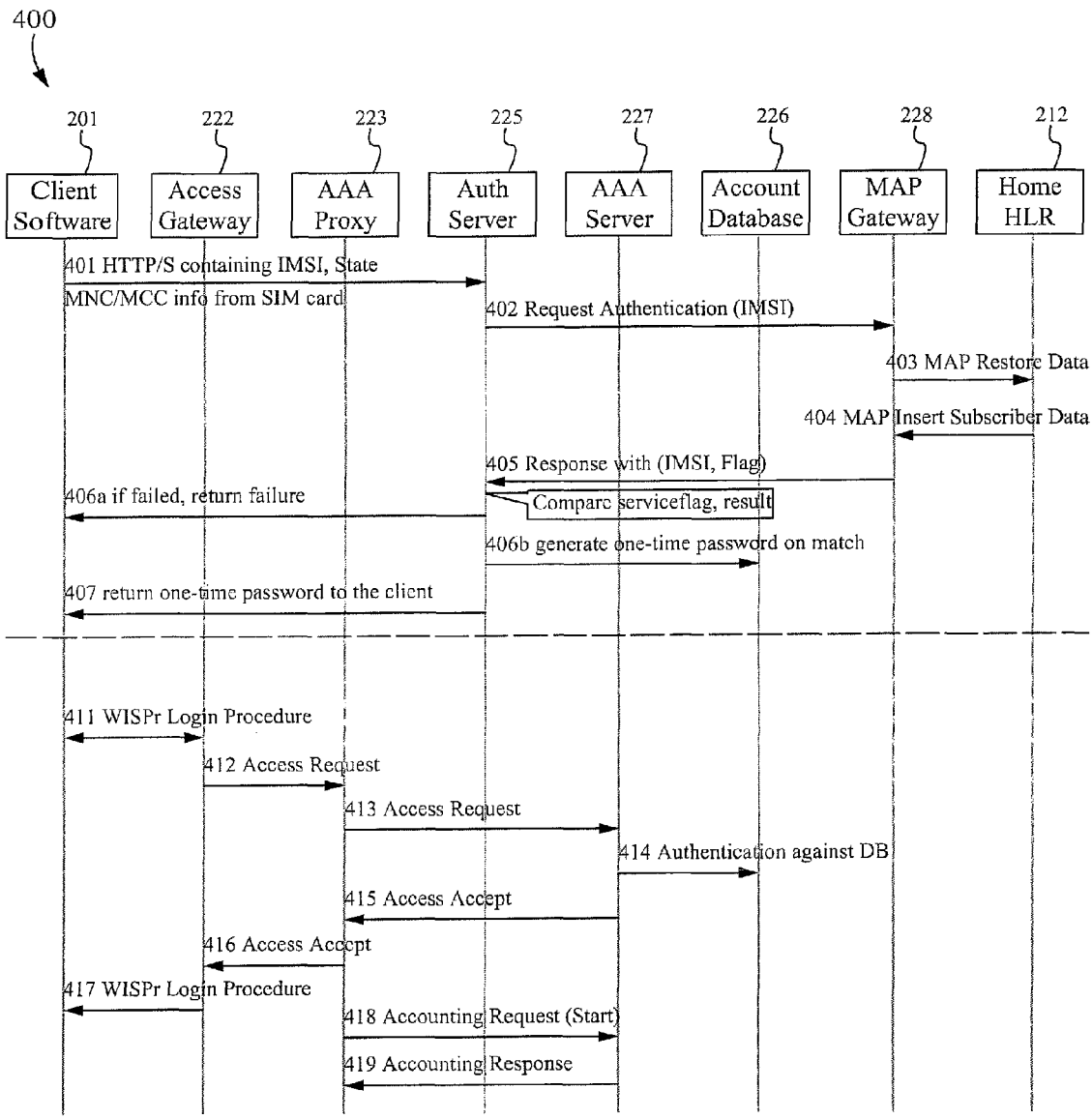
FIG. 4 is a signaling call flow for an authentication and registration procedure that uses a first network's service status to login to a second (Wi-Fi) network in accordance with one embodiment of the invention.

FIG. 4 is a message flow diagram 400 for an authentication process according to one embodiment of the invention. In this process, the SIM card Service Status result is passed from a first communication network to a second communication network, thereby authenticating the user in the second communication network. The user is then logged into the second communication network using the WISPr 1.0 protocol.

As one example, referring to FIGS. 2 and 4, when the user device 200 enters into the coverage of the second network 260, the client 201 scans the area for available networks and detects that the second network 260 is suitable to connect to. The client 201 utilizes the Service Status API of the user device 200 to retrieve the current Service Status (e.g., IN_STATE in FIG. 5) of the device 200 at the first communication network 250, and also retrieves the IMSI from the SIM card 202. In a message 401, the client 201 transmits the IMSI through a secured channel to the Auth Server 225. The IMSI can be encrypted for secure transmission over the secure channel using one or more multiple-level encryption algorithms such as transport layer security (TLS), secure sockets layer (SSL), Triple Data Encryption Standard (3-DES), or any combination thereof, to name only a few such algorithms. In a message 402, the Auth Server 225 requests the MAP Gateway 228 to verify that the IMSI is valid and to retrieve the authorization information from the first network's Home HLR 212. In a message 403, the MAP Gateway 228 communicates with the HLR 212 using the MAP Protocol in GSM. The message 403 is the MAP_RESTORE_DATA message defined in 3rd Generations Partnership Project Technical Specification 09.02 Mobile Application Part (3GPP TS 09.02 MAP) specification, incorporated by reference in its entirety, requesting the Home HLR 212 to send to the MAP Gateway 228 all data that are to be stored in the subscriber's IMSI record. The Home HLR 212 then validates the IMSI and, in a message 404, responds to the MAP Gateway 228 with a MAP_INSERT_SUBSCRIBER_DATA message containing subscriber parameters. The subscriber parameters contained in the message 404 have a flag/field that explicitly indicates whether Wi-Fi service on the second network 206 is provisioned for the subscriber. The MAP Gateway 228 fetches this flag/field and, in a message 405, transfers this information to the Auth Server 225.

On receiving the message 405 from the MAP Gateway 228, the Auth Server 225 validates the authorization information to make sure that the SIM card 202 subscribes to the service for the second network 206; if not, in a message 406a, the Auth Server 225 returns to the client 201 an error message with a detailed failure code. If the SIM card 202 does not subscribe to this service for the second network 260, the authentication procedure stops, and the user is denied access to the second network 260. Otherwise, the Auth Server 225 (a) generates a one-time username and password combination and transmits to the Account Database 226 a message 406b instructing the Account Database 226 to store the one-time username and password combination along with the IMSI (thereby mapping the client 201 to the one-time username and password combination and the IMSI) and (b) sends a SUCCESSFUL response message 407 back to the client 201, including the newly generated one-time username and password combination.

On receiving the message 407, the client 201 follows the standard WISPr 1.0 procedure to perform the Wi-Fi network login and authentication procedure, by providing a username and password combination to the Access Gateway 222. In one embodiment, the username and password combination is the one-time username and password received in the step 407.

In this embodiment, the authentication is conducted at the AAA Server 227 and Account Database 226. Thus, the user device 200 can successfully finish the authentication procedure as long as the client 201 correctly returns the password back to the Access Gateway 222.

The procedure associated with the messages 411 to 419 closely follows the procedure described in the document "Wireless ISP roaming (WISPr) 1.0," Appendix D of a "Smart Client to Access Gateway Protocol," which is hereby incorporated by reference in its entirety. As one example, the client 201 and the Access Gateway 222 exchange messages 411 to perform the WISPr login procedure. Next, the Access Gateway 222 sends an Access Request message 412 to the AAA Proxy 223, which sends a corresponding Access Request message 413 to the AAA server 227. The AAA server 227 then sends an Authentication Request message 414 to the Account Database 226 to authenticate the client 201 against the records in the Account Database 226. If the client 201 is authenticated, the AAA server 227 responds to the AAA proxy 223 with an Access Accept message 415, and the AAA proxy 223 sends a corresponding Access Accept message 416 to the Access Gateway 222. The Access Gateway 222 then sends a message 417 to the client 201 indicating that the WISPr login procedure was successful, and the AAA Proxy 223 sends an Accounting Request (Start) message 418 to the AAA server 227. The AAA server 227 responds to the AAA Proxy 223 with an Accounting Response message 419. The user device 200 is now able to access the second network 260, with proper accounting for charges incurred.

It will be appreciated that the message flow diagram 400 is only one example of accessing a network using the principles of the invention. After reading this disclosure, those skilled in the art will recognize other ways of accessing wireless networks using the principles of the invention.

FIG. 5 is an exemplary API definition on the Android™ operating system, used to illustrate the availability of the Service Status API available on Android configured user devices. The class "android.telephony.ServiceState" is a public class defined in the Android Operating System, which can be found at http://developer.android.com/reference/android/telephony/TelephonyManager.html. As shown in FIG. 5, the class contains mobile phone state and service related information, including Service state, Roaming indicator, Operator name, short name and numeric id. The Service state is further divided into IN_SERVICE, OUT_OF_SERVICE, EMERGENCY_ONLY, and POWER_OFF. The state IN_SERVICE is a normal operating condition that means the mobile phone is registered with an operator either in a home network or in roaming. The IN_SERVICE state is used to check whether the SIM card has successfully passed the authentication and registration process of a first communication network, such as the communication network 250 in FIG. 2. The class offers the public API "int getState( )" for the application to retrieve the Service State. As explained above, when used in accordance with embodiments of the invention, the IN_SERVICE state is used to determine whether a mobile device is allowed to access a second communication network without having to perform lengthy, processing intensive encryption algorithms.

The class also offers the API "public String getOperatorNumeric( )" to get the currently registered operator numeric id. In GSM/UMTS, the numeric format is a 3-digit country code plus a 2 or 3 digit network code. Using the API, the Auth Server 225 (FIG. 2) can retrieve the currently registered network information and further confirm the registration status of the device 200 with the home HLR 212.

While FIG. 5 is an example of an API using the Android™ Operating System, those skilled in the art will recognize that other operating systems have similar Service State APIs that the client 201 can call. Examples of other such operating systems include Windows Mobile, Blackberry®, and Symbian®. Those of ordinary skill in the art will recognize other, similar APIs, classes, or both.

Other versions of Android APIs identify the service states by slightly different names but similar functionality. For example, Reto Meier, "Professional Android™ 2 Application Development" 397 (Wiley Publishing, Inc. 2010) describes the service states STATE_IN_SERVICE, STATE_EMERGENCY_ONLY, STATE_OUT_OF_SERVICE, and STATE_POWER_OFF. The Telephony Manager and monitoring changes in phone state, phone activity, and data connections are all described in "Professional Android™ 2 Application Development" at pages 392-398, which are hereby incorporated by reference. The getState method and the returned service states are also described in Laurence Darcey and Shane Conder, "Android™ Wireless Application Development" 354-356 (2d. ed., Addison-Wesley 2010). Pages 353-357 of "Android™ Wireless Application Development" are hereby incorporated by reference.

In one embodiment, the getState method on the Service State object returns the current service state as one of the following ServiceState constants:

STATE_IN_SERVICE Normal phone service is available.
STATE_EMERGENCY_ONLY Phone service is available but only for emergency calls.
STATE_OUT_OF_SERVICE No cell phone service is currently available.
STATE_POWER_OFF The phone radio is turned off (usually when airplane mode is enabled).

In accordance with embodiments of the invention, a mobile device with a subscription to use a first communication network is subscribed to use a second communication network. Preferably, the first network operator has a contract with the second network operator that allows the mobile device to use the second communication network whenever the mobile device roams into coverage of the second communication network. This subscription status (roaming rights) with the second communication network is stored at the first communication network, such as in its HLR, at the second communication network, such as at the AAA server, or at any easily accessible location.

In operation of one embodiment, the mobile device is registered to use the first communication network after a user credential on the mobile device is authenticated by the first communication network. The registration status is indicated by a Service Status parameter. When the mobile device roams into coverage of the second communication network, the Service status is transferred to the second communications network, which communicates with the first network to verify that the mobile device has a subscription to use the second communication network. If this subscription is verified, the mobile device receives parameters to log on to the second communication network and uses these parameters to log on.

Embodiments of the present invention provide an advantageous and immediately available solution to enable the seamless SIM card based authentication across multiple operating systems, without the need to work with each individual user device vendor to get the SIM API to generate the A3/A8 authentication result.

Several embodiments have been described above to illustrate the principles of the invention. It will be readily apparent to those skilled in the art that modifications may be made to the embodiments without departing from the spirit and scope of the invention as defined by the appended claims.

What is claimed is:

1. A method of granting a mobile device access to a second wireless network comprising:
   authenticating a mobile device on a first wireless network using a user credential;
   registering the mobile device on the first wireless network;
   responsive to a successful registration of the mobile device on the first wireless network, changing a service state value of the mobile device to correspond to an "in service" status, wherein the service state value is selected from a set of constant values each indicating a service status of the mobile device on the first wireless network;
   retrieving the service state value by a client, the client comprising a set of instructions stored on a non-transitory medium and being executed by a processor, or the client comprising one or more application specific integrated circuits;
   the client automatically transmitting the service state value to a second wireless network thereby transferring an authentication result of the mobile device on the first network to the second network to pass authentication requirements of the second network, wherein the second wireless network is a Wi-Fi network; and
   granting the mobile device access to the second wireless network responsive to the service state value corresponding to the "in service" status indicating that the mobile device is registered on the first wireless network, whereby the mobile device must be authenticated with the first wireless network in order to gain access to the second wireless network.

2. The method of claim 1, wherein access rights for the first wireless network are mapped to access rights for the second wireless network.

3. The method of claim 1, wherein the user credential is a component of the mobile device and uniquely identifies the mobile device among other mobile devices supported by a mobile phone subscriber.

4. The method of claim 3, wherein the component comprises a Subscriber Identity Module card, a Universal Subscriber Identity Module card, or a Removable User Identity Module card.

5. The method of claim 1, wherein the first wireless network comprises a Global System for Mobile Communications (GSM) network, a Universal Mobile Telecommunications System (UMTS) network, a Code Division Multiple Access (CDMA) network, a Long Term Evolution (LTE) network, or any combination thereof.

6. The method of claim 1, wherein granting the mobile device access to the second wireless network automatically occurs when the mobile device roams into a communication range of the second wireless network.

7. The method of claim 1, wherein granting the mobile device access to the second wireless network comprises issuing a single-use combination of a username and a password for logging into the second wireless network.

8. The method of claim 1, wherein granting the mobile device access to the second wireless network comprises issuing to the mobile device a single-use user token for logging into the second wireless network.

9. The method of claim 1, wherein the service status is received at the second wireless network using a secure transmission.

10. A method of accessing a network using a mobile device comprising:
    authenticating a mobile device on a first wireless network using a user credential;
    registering the mobile device on the first wireless network;
    responsive to a successful registration of the mobile device on the first wireless network, changing a service state value of the mobile device to correspond to an "in service" status;
    automatically retrieving from a mobile device a service status of the mobile device for accessing a first network, wherein the service status comprises a service state, the service status is determined by authenticating a user credential of the mobile device, and a value of the service state is selected from a set of constant values each indicating a different state of the mobile device on the first network, the different service states comprise "in service" and "out of service"; and
    accessing the second network using a registration protocol of the second network after the service status value corresponding to the "in service" status has been automatically transferred to the second network by a client, whereby the mobile device must be authenticated with the first wireless network in order to gain access to the second wireless network, the client comprising a set of instructions stored on a non-transitory medium and being executed by a processor, or the client comprising one or more application specific integrated circuits, wherein the second network is a Wi-Fi network.

11. The method of claim 10, further comprising a first authentication server on the first network, wherein the first authentication server is configured to validate a subscription status of the mobile device for using the second network.

12. The method of claim 11, wherein the subscription status determines whether the mobile device is allowed to access the second network.

13. The method of claim 10, wherein the second network comprises an authentication server.

14. The method of claim 10, wherein the service status of the mobile device is accessed through an application programming interface of an operating system executing on the mobile device.

15. The method of claim 10, wherein the user credential is a component of the mobile device and uniquely identifies the mobile device among other mobile devices supported by a mobile phone subscriber.

16. The method of claim 15, wherein the component comprises a Subscriber Identity Module card, a Universal Subscriber Identity Module card, or a Removable User Identity Module card.

17. A method of completing an authentication and registration procedure in a second communication network by utilizing an authentication and registration result for a user credential in a first communication network, the method comprising:
    registering a device with the first communication network after a user credential of the device has been successfully authenticated by a first authentication server of the first communication network;
    retrieving a registered service status of the device with the first communication network through an application programming interface of the device, wherein the registered service status comprises a service state stored on the device, wherein the service state is changed when the device is authenticated to access the first communication network to indicate that the device is registered with the first communication network, wherein a value of the service state is selected from a set of values each indicating a different service state of the device on the first communication network, the service state values determined before the device is authenticated by the first communication network, the different service states comprise "in service" and "out of service";
    automatically transferring the registered service status securely to a second authentication server of the second communication network;
    validating the registered service status and subscription status based on information stored at the first authentication server;
    granting or denying the device access to the second network based on a result of the validating responsive to the service state value corresponding to the "in service" status, whereby the mobile device must be authenticated with the first wireless network in order to gain access to the second wireless network; and
    registering the device with the second communication network using a registration protocol of the second communication network, thereby allowing the device to access the second communication network, wherein the second communication network is a Wi-Fi network.

18. The method of claim 17, wherein the first communication network comprises a GSM network, a UMTS network, a CDMA network, or an LTE network.

19. The method of claim 17, wherein the user credential comprises a card selected from the group consisting of a SIM card, a USIM card, or an RU™ card.

20. The method of claim 17, wherein retrieving the registered service status of the device is performed by a client running on the device.

21. The method of claim 17, wherein the client comprises a wireless device operating system executing on the mobile device.

22. The method of claim 21, wherein the operating system is Android™ operating system, Windows Mobile operating system, Blackberry® operating system, iOS™ operating system, Symbian® operating system, Meego™ operating system, or Mango operating system.

23. The method of claim 17, wherein the registered service status of the device is packaged with an identifier of the user credential to form a service status information package.

24. The method of claim 23, wherein an identifier of the user credential comprises a Mobile Station Integrated Services Digital Network (MSISDN) of the card.

25. The method of claim 17, wherein the registered service status of the device is packaged with a registration status of the user credential on the first communication network to form a service status information package.

26. The method of claim 17, wherein the registered service status of the device is packaged with an identifier of the first communication network to form a service status information package.

27. The method of claim 26, wherein an identifier of the user credential comprises an International Mobile Station Identity (IMSI) of the card.

28. The method of claim 17, wherein the authentication server of the first communication network comprises an HLR, an HSS, an AuC, or an AAA server.

29. The method of claim 17, wherein the authentication server of the second communication network is an AAA server.

30. The method of claim 17, wherein transferring the registered service status is performed over a TCP/IP network.

31. The method of claim 17, wherein transferring the registered service status is performed using HTTP, HTTPS, or Session Initiation Protocol (SIP).

32. The method of claim 17, wherein transferring the registered service status is protected and secured with one or more multiple level encryption algorithms.

33. The method of claim 32, wherein the one or more multiple level encryption algorithms comprise TLS or 3 DES.

34. The method of claim 17, wherein validating the subscription status comprises:
receiving service state information for the user credential from the first authentication server;
comparing two service state information from different resources at the second authentication server; and
based on the comparing, validating that the device is subscribed to the service of the second communication network.

35. The method of claim 34, wherein receiving the service state information from the first authentication server comprises using MAP, IS-41, RADIUS, Diameter, or any combination thereof.

36. The method of claim 34, wherein validating the device is subscribed to the service of the second communication network is performed by the second authentication server, and subscription information of the card is stored on the first authentication server.

37. The method of claim 17, wherein granting the device access to the second communication network comprises issuing an authorization token.

38. The method of claim 37, wherein the authorization token is a one-use token.

39. The method of claim 37, wherein the authorization token is a multiple-use token.

40. The method of claim 37, wherein the authorization token comprises a one-time user name and password combination.

41. The method of claim 37, wherein the authorization token comprises one or more certificates.

42. The method of claim 17, wherein a registration and authentication protocol for the second communication network comprises WISPr 1.0.

43. The method of claim 17, wherein a registration and authentication protocol for the second communication network comprises EAP TLS.

44. The method of claim 17, wherein a registration and authentication protocol for the second communication network comprises EAP TTLS.

45. A wireless device comprising a computer memory containing computer-executable instructions that when executed by a processor perform a method comprising:
detecting that a second communication network is available;
retrieving identifier information of a user credential associated with the wireless device;
retrieving from the wireless device service state information of a first communication network, wherein the service state information comprises a service state of the wireless device on the first communication network, the service state is updated after the wireless device is authenticated, and a value of the service state is selected from a set of values determined before the wireless device roams into communication range of the first wireless network;
automatically transferring the service state information to a second authentication server of a second communication network by a client, the client comprising a set of instructions stored on a non-transitory medium and being executed by a processor, or the client comprising one or more application specific integrated circuits, wherein the second communication network is a Wi-Fi network;
receiving an authentication result from a second authentication server of the second communication network whereby the mobile device must be authenticated with the first wireless network in order to gain access to the second wireless network; and
registering the wireless device on and accessing the second communication network using a registration protocol of the second communication network responsive to the service state value corresponding to the "in service" status.

46. The method of claim 45, wherein the wireless device executes a smartphone operating system selected from the group consisting of Android™, Windows Mobile, Blackberry®, iOS™, Symbian®, Meego™, and Mango.

47. The method of claim 45, wherein the retrieving identifier information comprises using a system application programming interface of an operating system executing on the wireless device.

48. The method of claim 45, wherein the retrieving service state information comprises using a system application programming interface of an operating system executing on the wireless device.

49. An authentication server for completing an authentication and registration procedure in a second communication network by utilizing an authentication and registration result of a same credential in a first communication network, the authentication server comprising a memory containing computer-executable instructions that when executed by a processor perform a method comprising:
receiving identifier information of a user credential associated with a wireless device;
receiving service state information of the first communication network from the wireless device, wherein the service state information comprises a service state value of the wireless device on the first communication network, the service state value is changed when the wireless device is authenticated on the first communication network to indicate that the wireless device has an "in service" status on the first communication network, the service state information being automatically transmitted by a client, the client comprising a set of instructions stored on a non-transitory medium and being executed by a processor, or the client comprising one or more application specific integrated circuits;
validating the service status with an authentication system of the first communication network, the validation of the service status being based on the service state of the wireless device, whereby the mobile device must be authenticated with the first wireless network in order to gain access to the second wireless network; and granting the wireless device access to the second communication network based on the validation result responsive to the service state value corresponding to the "in service" status, wherein the second communication network is a Wi-Fi network.

50. The method of claim 49, wherein receiving the identifier information and the service state information is performed over a TCP/IP network.

51. The method of claim 49, wherein receiving the identifier information and the service state information is over a protocol selected from the group consisting of HTTP, HTTPS, and Session Initiation Protocol (SIP).

52. The method of claim 49, wherein receiving the service state information from the authentication system of the first communication network comprises using a protocol selected from the group consisting of MAP, IS-41, RADIUS, Diameter, or any combination thereof.

53. The method of claim 49, wherein granting the wireless device access to the second communication network comprises issuing an authorization token.

54. The method of claim 53, wherein the authorization token is a one-use token.

55. The method of claim 53, wherein the authorization token is a multiple-use token.

56. The method of claim 53, wherein the authorization token comprises a one-time user name and password combination.

57. The method of claim 53, wherein the authorization token comprises a multiple-time user name and password combination.

58. The method of claim 53, wherein the authorization token comprises a one-time certificate.

59. The method of claim 53, wherein the authorization token comprises a multiple-use certificate.

60. The method of claim 49, wherein granting the wireless device access to the second communication network comprises storing the authorization token in a database.

* * * * *

UNITED STATES PATENT AND TRADEMARK OFFICE
CERTIFICATE OF CORRECTION

PATENT NO. : 9,716,999 B2  
APPLICATION NO. : 13/431822  
DATED : July 25, 2017  
INVENTOR(S) : David Xining Zhang, Huiyue Xu and Bing Li Page 1 of 1

It is certified that error appears in the above-identified patent and that said Letters Patent is hereby corrected as shown below:

On the Title Page

Item (73) should read:  
Assignee: Syniverse Communications, Inc.,
       Tampa, FL (US)

Signed and Sealed this  
Twelfth Day of September, 2017

Joseph Matal  
*Performing the Functions and Duties of the*  
*Under Secretary of Commerce for Intellectual Property and*  
*Director of the United States Patent and Trademark Office*